United States Patent [19]

Allen et al.

[11] Patent Number: 5,610,455
[45] Date of Patent: Mar. 11, 1997

[54] ELECTRET CONTAINING SYNDIOTACTIC VINYL AROMATIC POLYMER

[75] Inventors: Richard C. Allen, Mendota Heights; Anthony F. Flannery, Woodbury; Charles R. Kleissler, Hugo; David B. Redmond, St. Paul, all of Minn.

[73] Assignee: Minnesota Mining and Manufacturing Company, St. Paul, Minn.

[21] Appl. No.: 496,356

[22] Filed: Jun. 29, 1995

[51] Int. Cl.$^6$ ................................................. G11C 13/02
[52] U.S. Cl. ................... 307/400; 428/212; 55/DIG. 39; 96/99
[58] Field of Search ........................... 307/400; 428/212; 55/155, DIG. 39

[56] References Cited

U.S. PATENT DOCUMENTS

| | | | |
|---|---|---|---|
| 3,632,443 | 1/1972 | Kodera et al. | 117/227 |
| 4,086,499 | 4/1978 | Mishra | 307/88 ET |
| 4,288,584 | 9/1981 | Mishra | 526/348.4 |
| 4,456,648 | 6/1984 | Adamse et al. | 428/283 |
| 4,513,049 | 4/1985 | Yamasaki et al. | 428/194 |
| 4,626,263 | 12/1986 | Inoue et al. | 55/155 |
| 4,680,353 | 7/1987 | Ishihara et al. | 526/160 |
| 4,824,629 | 4/1989 | Seitz et al. | 264/291 |
| 4,874,399 | 10/1989 | Reed et al. | 55/2 |
| 4,937,272 | 6/1990 | Sumitomo | 521/59 |
| 4,959,435 | 9/1990 | Seitz et al. | 526/347.2 |
| 5,004,649 | 4/1991 | Yamasaki et al. | 428/461 |
| 5,015,275 | 5/1991 | Beck et al. | 55/158 |
| 5,145,950 | 9/1992 | Funaki et al. | 528/481 |
| 5,166,238 | 11/1992 | Nakano et al. | 524/120 |
| 5,183,871 | 2/1993 | Yamasaki et al. | 526/347.2 |
| 5,200,454 | 4/1993 | Nakano | 524/409 |
| 5,262,504 | 11/1993 | Tazaki et al. | 526/347 |
| 5,316,703 | 5/1994 | Schrenk | 264/1.3 |
| 5,391,626 | 2/1995 | Machida et al. | 525/242 |
| 5,391,671 | 2/1995 | Tazaki et al. | 526/347 |

FOREIGN PATENT DOCUMENTS

| | | |
|---|---|---|
| 0591055A2 | 4/1994 | European Pat. Off. . |
| 50-400 | 1/1975 | Japan . |
| 497798 | 10/1992 | Japan . |
| 5-217802 | 8/1993 | Japan . |

OTHER PUBLICATIONS

Sessler, G. M., "Electrets", *Topics in Applied Physics*, vol. 33, Chapter 1, pp. 1 (1980).

Sessler, G. M., "Electrets", *Topics in Applied Physics*, vol. 33, Chapter 2, pp. 20–39 (1980).

Baba et al., "Drawing and annealing effects on thermally stimulated currents in polypropylene films", *J. Appl. Physics*, vol. 72, No. 5, pp. 2057–2059 (1992).

Shrivastava, et al., "Effect of Doping on Thermally Stimulated Discharge Current in Polystyrene", *Physics Letters*, vol. 69A, No. 6, pp. 465–467 (1979).

Ishihara et al., "Crystalline Syndiotactic Polystyrene", *Macromolecules*, vol. 19, pp. 2464–2465 (1986).

Kawamura et al., "Comparison of $^{13}$C NMR spectra of polystyrenes having various tacticities and assignment of the spectra", *Macromolecular Rapid Communications*, vol. 15, pp. 479–486 (1994).

Paul, D. R., "Interfacial Agents ('Compatibilizers') for Polymer Blends", *Polymer Blends*, vol. 2, Chapter 12, pp. 35–62 (1978).

Liu et al., "Reactive Polymers for Blend Compatibilization", *Advances in Polymer Technology*, vol. 11, No. 4, pp. 249–262 (1992).

*Primary Examiner*—William M. Shoop, Jr.
*Assistant Examiner*—Kim Lockett
*Attorney, Agent, or Firm*—Gary L. Griswold; Walter N. Kirn; John A. Fortkort

[57] ABSTRACT

Electrets are disclosed comprising syndiotactic vinyl aromatic polymer, for example syndiotactic polystyrene. These electrets have good charge retention at elevated temperature.

21 Claims, No Drawings

ELECTRET CONTAINING SYNDIOTACTIC VINYL AROMATIC POLYMER

This invention relates to electrets comprising synthetic polymers, in particular, vinyl-aromatic based polymers, for example polystyrene.

An electret may be defined as a quasi-permanently electrically-charged dielectric material. See, e.g., G. M. Sessler, *Topics in Applied Physics,* vol. 33, Chapter 1, pg. 1 (1980), and U.S. Pat. No. 4,288,584 (Mishra). The electret charge may consist of real charge (such as surface and/or space charges) and/or polarization of dipoles. Real charges comprise layers of trapped positive and negative charge carriers.

The oldest practical application of electrets were transducers, such as those in microphones and speakers. Other applications include electrophotography, motors, relay switches, optical display systems, radiation dosimeters, electroacoustic transducers, non-contact switches, pyroelectric devices, strain gauges, air filtration, electret bandages, and medical supplies, to mention a few.

There are a number of methods for forming electrets by charging and polarizing substrates. For example, G. M. Sessler, *Topics in Applied Physics,* vol. 33, Chapter 2, pp. 20–39 (1980), states that the charging of space or surface charge electrets is mostly achieved by injecting or depositing charge carriers by discharges, electron or particle beams, contact electrification, photoelectric processes, or other techniques through or onto a nonmetallized surface with or without a contacting fluid. Injection from a deposited metal layer is also possible at relatively high fields. Other methods consist of generation of carriers within the dielectric by light, radiation, or heat and simultaneous charge separation by a field. Dipole electrets are generally polarized by the application of an electric field at a constant temperature or at decreasing temperatures from an appropriately high to an appropriately low temperature. Dipolar charging has also been achieved by corona charging.

A variety of materials have been used to prepare electrets. While early work on electrets utilized thick plates of carnauba wax, more recent electrets use films made from synthetic polymers.

Kodera et al. (U.S. Pat. No. 3,632,443) teach that polypropylene can be used to form electrets. See also, Baba and Ikezaki (J Appl. Physics 72, pp. 2057–9 (1992)).

Mishra (U.S. Pat. No. 4,288,584) teaches that branched poly-alpha-olefins such as poly(4-methyl-1-pentene) can be used to prepare electrets. Japanese Patent Application 05[1993]217,802 also discloses that electrets can be made from polyolefins, such as syndiotactic polypropylene. See also, for example, Reed and Jones (U.S. Pat. No. 4,874,399), Adamsee and van Turnhour (U.S. Pat. No. 4,456,648), and Yamasaki and Kagawa (U.S. Pat. No. 4,513,049).

Mishra (U.S. Pat. No. 4,086,499) discloses certain electrets made of polystyrene. See also, Shrivastava et al (Physics Letters, vol. 69A, no. 6, pages 465-7, January 1979).

Inoue and Matsuura (U.S. Pat. No. 4,626,263) report that an electret can be formed from binary blends. One example comprises a mixture of poly(methyl methacrylate) and poly(vinylidene fluoride). Also reported are binary blends of a nonpolar polymer and a polar polymer to combine the strengths of the two different types of materials. One example electret comprising polystyrene as the non-polar polymer and chlorinated polyethylene as the polar polymer is disclosed. It is taught that the charges are easily trapped at the boundaries between the two polymers.

Japanese Patent Application 49[1974]7,798 reports that a three-component blend of poly(vinylidene fluoride), poly(methyl methacrylate), and polystyrene displays both excellent polarization electrical charge density and excellent charge stability when exposed to high humidity.

Japanese Patent Application 49[1974]7,798 discloses multilayer laminate composites of polystyrene and a blend of poly(vinylidene fluoride), poly(methyl methacrylate), and polystyrene. See also Japanese Patent Application 50[1975] 400.

Syndiotactic-polystyrene (sPS) is a relatively new polymer. Ishihara, Kuramoto, and Uoi (U.S. Pat. No. 4,680,353) disclose a process for the production of vinyl aromatic polymers of syndiotactic configuration. Seitz, Berglund, and Pasztor (U.S. Pat. No. 4,824,629 and U.S. Pat. No. 4,959,435) disclose a process for the preparation of oriented, crystalline sPS. See also Funaki and Yamazaki (U.S. Pat. No. 5,145,950), Funaki, Yamasaki, and Keisuke (U.S. Pat. No. 5,183,871), Sumitomo (U.S. Pat. No. 4,937,272), Beck and others (U.S. Pat. No. 5,015,275), Nakano et al. (U.S. Pat. No. 5,166,238), Nakano (U.S. Pat. No. 5,200,454), and Yamasaki and Türk (U.S. Pat. No. 5,004,649).

Briefly, in one aspect, the present invention provides electrets comprising a charged composition comprising syndiotactic vinyl aromatic polymer, for example, syndiotactic-polystyrene. The electrets of this invention have good charge retention at elevated temperature.

The present invention discloses electrets comprising syndiotactic vinyl aromatic polymer. Such electrets can comprise neat polymer films of syndiotactic vinyl aromatic polymer, polyblend films comprising syndiotactic vinyl aromatic polymer and another polymer such as polypropylene, as well as multilayer films comprising alternating layers with or without syndiotactic vinyl aromatic polymer.

The syndiotactic vinyl aromatic polymers useful in the present invention may be homopolymers, block copolymers, random copolymers, or alternating copolymers. At least 25 mole % of the interpolymerized units in the syndiotactic vinyl aromatic polymers should be derived from aromatic monomers, preferably at least 50 mole %, most preferably at least 90 mole %.

As used in this specification and claims, "syndiotactic vinyl aromatic polymers" refers to polymers having syndiotacticity of at least 75% racemic diad as determined by carbon-13 nuclear magnetic resonance using techniques described by Ishihara et at., "Crystalline Syndiotactic Polystyrene," *Macromolecules,* Vol. 19, pp. 2464–2465 (1986) or Karamura et al., "Comparison of $^{13}$C NMR spectra of polystyrenes having various tacticities and assignment of the spectra," *Macromolecular Rapid Communications,* Vol. 15, pp. 479–486 (1994). For the syndiotactic vinyl aromatic polymers of this invention, such sydiotacticity refers to the orientation of two adjacent, pendant, aromatic moieties, sometimes referred to as a "diad." Preferably, the degree of syndiotacticity is higher than 85% racemic diad.

Syndiotactic vinyl aromatic polymers useful in the current invention include homopolymers and copolymers derived from styrene, alkyl styrenes, halogenated styrenes, alkoxy styrenes, and vinyl ester benzoate. Examples of alkyl styrenes include: methyl styrene, ethyl styrene, propyl styrene, butyl styrene, phenyl styrene, vinyl styrene, vinyl naphthalene, and acenaphthalene. Examples of halogenated styrenes include: chloro styrene, bromo styrene, and fluoro styrene. Examples of alkoxy styrenes include: methoxy styrene and ethoxy styrene.

Syndiotactic vinyl aromatic polymers useful in the this invention include copolymers comprising interpolymerized units derived from non-aromatic monomers. Such non-aromatic monomers include: olefin monomers such as ethylene, propylene, butene, hexene, or octene; diene monomers such as butadiene or isoprene; polar vinyl monomers such as cyclic diene monomer, methyl methacrylate, maleic acid anhydride, and acrylonitrile.

The weight average molecular weight of the syndiotactic vinyl aromatic polymers is preferably greater than 10,000 and less than 1,000,000; or more preferably, greater than 50,000 and less than 800,000.

The charged compositions useful in the present invention comprise syndiotactic vinyl aromatic polymer. The charged composition may consist of or consist essentially of the syndiotactic vinyl aromatic polymer. The charged composition may also comprise a blend of the syndiotactic vinyl aromatic polymer with other polymers. Such blends may be blends with polymers that are either miscible or immiscible with the syndiotactic vinyl aromatic polymer.

Examples of useful miscible blends includes blends with atactic and isotactic vinyl aromatic polymers, poly(vinyl methyl ether) and substituted and unsubstituted polyphenylene ether. Preferably, the syndiotactic vinyl aromatic polymer comprises at least 30% by weight, more preferably at least 50% by weight of the composition based on the total weight of polymers in the blend. When the amount of syndiotactic vinyl aromatic polymer in the composition is less than about 30 weight %, loss of the thermal stability of the electret charge may occur.

Examples of useful immiscible polymers include all polymers excluding the above-explained miscible resins as well as crosslinked resins containing miscible resins explained above. Examples of immiscible other polymeric resins include: polyolefins such as polyethylene, polypropylene, polybutene, or polypentene; polyesters such as polyethylene terephthalate, polybutylene terephthalate, or polyethylene naphthalate; polyamides such as nylon-6, nylon 6,6, nylon 11, or segmented or block copolymers containing polyamides; polythioether; vinyl halide polymers such as polyvinyl chloride, polyvinyl fluoride, polyvinylidene fluoride, poly(trifluoroethylene), poly(chlorotrifluoroethylene), poly(tetrafluoroethylene), or copolymers thereof; polycarbonate; polysulfone; polyphenylene sulfide; polyether ether ketone; polyether sulfone; polyimides; acryl group polymers such as polymethyl methacrylate; or polyvinyl alcohol. With immiscible blends, preferably, the syndiotactic vinyl aromatic polymer comprises at least 5%, more preferably at least 20%, by weight of the composition based on the total weight of polymers in the blend. Furthermore, when the use temperature of the electret is expected to be high, it is recommended that the choice of immiscible resin not degrade the thermal stability of the electret charge.

Immiscible polymers may be more effectively dispersed with the syndiotactic vinyl aromatic polymer through the use of interfacial modifiers or compatiblizers. Compatibilizers such as graft or block copolymers may be added prior to or during blending or extrusion. Functional compatibilizers may be formed during extrusion by adding reactive materials. See, e.g., "Interfacial Agents for Polymer Blends" by D. R. Paul (Chapter 12, *Polymer Blends*, volume 2, pp. 35–62 edited by D. R. Paul and S. Newman 1978); or "Reactive Polymers for Blend Compatibilization" by N. C. Liu and W. E. Baker (*Advances in Polymer Technology*, volume 11(4) pp. 249–62 (1992)). See also Machida, Yazaki, and Tani (U.S. Pat. No. 5,391,626) and Tazaki and Kuramoto (U.S. Pat. Nos. 5,262,504 and 5,391,671).

The charged compositions useful in this invention may contain various additional components, for example, inorganic microparticles. See, e.g., Japanese Patent Application 62[1987]187,708. In order to effectively disperse these microparticles it may be useful to use dispersants or surfactants. Other additives that may be used include, for example, antioxidants, flame retardants, inorganic fibers, and fillers. See, for example, Nakano et al (U.S. Pat. No. 5,166,238) and Nakano (U.S. Pat. No. 5,200,454).

The electrets of the present invention may comprise multiple layers, for example, multilayer films. The use of interfacial modifiers, adhesives, or tie layers may also be used between the charged composition layer and the thermoplastic material layers. The number of layers may vary from two to several thousand. Preferably, the total multilayer composition comprises at least 5%, more preferably at least 20%, by weight of the syndiotactic vinyl aromatic polymer based on the weight of the total multilayer composition. In some situations, it may be preferable for the syndiotactic vinyl aromatic polymer to be unevenly distributed within the composition. For example, it may be preferably for the syndiotactic vinyl aromatic polymer to be concentrated at the surfaces or in alternating layers. For example, it may be preferable for 80% or more of the snydiotactic vinyl aromatic polymer to be found in 20% or less of the volume of the multilayer composition. Processes for making laminate structures are well documented. For example, see Bland et al (European Patent Application 591,055) and Schrenk (U.S. Pat. No. 5,316,703). See also Yamasaki and Türk (U.S. Pat. No. 5,004,649).

The electrets of this invention can be shaped using conventional techniques, including orientation of films and fibers and optional post heat treating procedures, and then charged, again, using conventional techniques. The electret can be characterized in a number of different ways. Many of the important techniques have been described by van Turnhout (in *Topics in Applied Physics*, vol. 33, Chapter 3, pp. 81–215 1980).

EXAMPLES

In the following examples and comparative examples, films were prepared, charged, and evaluated. Two techniques were employed to characterize the present invention: current thermally stimulated discharge in an closed circuit ("TSC") and charge thermally stimulated discharge in an open circuit ("TSD").

In the TSC tests, the sample was circularly die cut to an area of 38 $mm^2$. The sample was analyzed using a Solomat™ TSC/RMA instrument. The instrument automatically heated the sample to 120° C. prior to charging/poling by the application of a 3000 VDC per mm electrical field. The field was maintained for 2 minutes before cooling the sample to −140° C. After maintaining the field at the low temperature for 2 minutes, the external, imposed electrical field was zeroed, the circuit shorted, and the sample reheated at a rate of 7° C. per minute. The discharge current was measured and recorded.

In the TSD tests, the sample was metallized on one side only to a thickness of at least about 5 nm using a gold sputter coater (about 15 nm) and charged at room temperature by exposure of the sample to a corona discharge generated by a parallel array of wires charged to between 200 and 450 VDC. Next, the sample was placed into an apparatus built by TNO Plastics and Rubber Research Institute (Delft, The Netherlands) in accordance with the principles described in *Topics in Applied Physics*, vol. 33, Chapter 3, pp. 170–7

(1980). The samples' surface potential from the non-metallized side of the sample was measured and recorded as the temperature was increased from room temperature to 150° C. at a rate of 2° C. per minute.

The output of a typical TSD experiment is shown in FIG. 1. The sample is usually heated from 30° to 150° C. where the voltage goes from the initial charging voltage, $V_o$, to essentially zero. The surface potential initially decreases very slowly with increases in temperature, after which it eventually undergoes a rapid decay with only small increases in temperature. Determination of a characteristic temperature is made by selecting an arbitrary decrease in voltage, in cases shown here, 3 decibels from the point where it starts to undergo rapid decay. The voltage, $V_B$, just prior to the onset of the rapid decay is determined by extrapolation of two linear regions just before and just after the onset of rapid charge decay, indicated by the lines connecting the points A–B and B–D. The temperature, $T_{3dB}$, is recorded for a 3 decibel reduction from $V_B$ indicated by point C.

The peak current temperatures associated with TSC are determined straightforwardly from the output of current versus temperature, and may result from positive or negative current flow. Numerous examples are provided in the discussions of van Turnhout (*Topics in Applied Physics*, vol. 33, Chapter 3, 1980).

Different fixtures were used to secure sample films in the TSC and TSD experiments. For the examples Cited herein, sample films with thicknesses greater than about 40 micrometers were measured by TSC, because these films tended to break during heating while being constrained by the specific sample holder used in TSD.

Example 1

A high molecular weight syndiotactic-polystyrene (sPS) homopolymer was obtained from Dow Chemical Company. The weight average molecular weight was about $2 \times 10^5$. The peak melting temperature as determined by differential scanning calorimetry was 272° C. when measured using a linear heating rate of 20° C. per minute. The homopolymer was extruded at 280° C. using a 40 mm Berstoff Twin Screw extruder at 5 kg/hr through a 37 cm drop die onto a casting wheel chilled to about 50° C. The quench rate of the molten polymers was enhanced through the use of electrostatic pinning. The resulting thickness of the cast web was about 250 microns. The web was then sequentially biaxially oriented, first 2.6:1 at 110° C. in the machine direction (MD) and then 2.7:1 at 120° C. in the transverse direction (TD). The film was cut into small pieces, metallized on one side, charged at room temperature by exposure of the sample to a corona discharge generated by a parallel array of wires, and then characterized by TSD. The TSD 3 dB temperatures are shown in Table 1.

Examples 2–4

Examples 2–4 were produced and evaluated as in Example 1 except the orientation conditions and the heat treatment conditions were varied as summarized in Table 1. Following orientation, the film was heat treated. The heat treatment step consisted of exposing the film to the heat treatment conditions as a step in a continuous process as part of a normal film tentering operation. The test results are also summarized in Table 1.

TABLE 1

| Example | Mw | Orientation | Heat Treatment | TSD 3dB Temperature |
|---|---|---|---|---|
| 1 | $2 \times 10^5$ | MD 2.6:1 @ 110° C. TD 2.7:1 @ 120° C. | — | 121° C. |
| 2 | $2 \times 10^5$ | MD 2.5:1 @ 115° C. TD 2.5:1 @ 120° C. | 230° C. | 131° C. |
| 3 | $2 \times 10^5$ | MD 3.0:1 @ 105° C. TD 3.5:1 @ 125° C. | 255° C. | 135° C. |
| 4 | $2 \times 10^5$ | MD 3.5:1 @ 115° C. TD 3.5:1 @ 120° C. | 255° C. | 139° C. |

The results in Table 1 show a high level of charge stability for neat films of sPS as evidenced by high values for TSD temperatures. The data also show, to a lesser degree, a dependence upon the degree of orientation and heat treatment.

Comparative Example C1

A commercial supply of atactic-polystyrene (aPS), Styron™ 663, was obtained from Dow Chemical Company, Midland, Mich. The aPS polymer was extruded as in Example 1. The resulting cast webs were biaxially oriented 2.5:1 at 120° C. in each of the MD and TD directions to produce an oriented film. To keep the films from melting, they were not heat treated following orientation. The films were then evaluated as in Example 1. The measured TSD 3 dB temperature was 81° C.

Comparative Example C2

A film was made using Fina 3230 isotactic-polypropylene (iPP), obtained from Fina Chemicals, using a single screw 1.9 cm extruder at 2.5 Kg/hr and 250° C. The iPP was extruded through a blown film die and orientation was accomplished by melt blowing with a biaxial blow up ratio of about 4. The films were then evaluated as in Example 1. The measured TSD 3dB temperature was 77° C.

Example 5

Homopolymer resin from Example 1 was compounded with 0.1% each of two antioxidants, Irganox 1010 (Ciba Geigy) and Ultranox 626 (General Electric Co.) extruded and cast in a manner similar to Example 1. The antioxidant-containing copolymer cast web was oriented 3.5:1 in the MD at 110° C. and 3.0:1 in the TD at 115° C. The film was then evaluated as in Example 1. The measured TSD 3 dB temperature was 114° C.

Examples 6–10

Examples 6–10 were prepared and evaluated as in Example 1 except the amount and type of the antioxidant were varied as summarized in Table 2. In Examples 8, 9, and 10 two additional antioxidants were studied, Irgafos 168 (from Ciba Geigy) and Mark PEP 36 (from Asahi Denka Kogyo K.K., Tokyo, Japan).

TABLE 2

| Example | Mw | Additive | 3dB TSD Temperature |
|---|---|---|---|
| 5 | $2 \times 10^5$ | 0.1 wt % each Irganox 1010 and Ultranox 626 | 114° C. |

TABLE 2-continued

| Example | Mw | Additive | 3dB TSD Temperature |
|---|---|---|---|
| 6 | $2 \times 10^5$ | 0.25 wt % each Irganox 1010 and Ultranox 626 | 111° C. |
| 7 | $2 \times 10^5$ | 0.1 wt % Irganox 1010 | 116° C. |
| 8 | $2 \times 10^5$ | 0.1 wt % each Irganox 1010 and Irgafos 168 | 115° C. |
| 9 | $2 \times 10^5$ | 0.1 wt % each Irganox 1010 and Mark PEP 36 | 116° C. |
| 10 | $2 \times 10^5$ | 0.1 wt % Mark PEP 36 | 117° C. |

The results in Table 2 show only slight changes in charge stability with a change in antioxidant type or concentration. The TSD temperatures for Examples 1 and 5–10 are lower than Examples 2–4, again reinforcing the dependence of degree of orientation and heat treatment.

Example 11

A syndiotactic vinyl aromatic copolymer (from Dow Chemical Company), with a comonomer molar ratio of 86/14 styrene/para-methyl styrene, and a weight average molecular weight of $2 \times 10^5$ was compounded with antioxidants as in Example 6, extruded and cast in a manner similar to Example 1. The antioxidant-containing copolymer cast web was oriented 3.5:1 in the MD at 120° C. and 3.0:1 in the TD at 120° C. The film was in-line heat treated at 205° C. following orientation. The film was then evaluated as in Example 1. The measured TSD 3 dB temperature was 115° C.

Example 12–13

Examples 12–13 were prepared as in Example 6, except the weight average molecular weight of the antioxidant containing homopolymer resin was $3.4 \times 10^5$. The cast web was oriented only in the machine direction. The orientation conditions and TSC peak current temperatures are shown in Table 3.

TABLE 3

| Example | Mw | Orientation | Heat Treatment | TSC Peak Current Temperature |
|---|---|---|---|---|
| 12 | $3.4 \times 10^5$ | MD 3.8:1 @ 110° C. | — | 137° C. |
| 13 | $3.4 \times 10^5$ | MD 4.5:1 @ 125° C. | — | 138° C. and 148° C. |

Example 14

A film was made of a miscible blend of 95 wt % syndiotactic vinyl aromatic polymer as used in Example 1 and 5 wt % poly(2,6-dimethylphenylene ether) ("PPO"), Blendex™ BHPP823, obtained from General Electric Chemicals. Additionally, 0.005% of an antioxidant, Westin™ 619F, obtained from General Electric Chemicals, was also compounded into the resins in a twin screw extruder and cast as in Example 1. The web was oriented first in the machine direction 4:1 at a temperature of 135° C. and then in the transverse direction at about 137° C., and finally heat treated at 255° C. TSD 3dB temperatures are shown in Table 4.

Example 15

Example 15 were made as in Example 14 except the compositions of PPO and antioxidant as well as the process conditions were varied as shown in Table 4. The concentration of antioxidant was 0.01%. The measured 3 dB TSD temperatures is summarized in Table 4.

Example 16–17

Examples 16–17 were made from a miscible blend of syndiotactic vinyl aromatic polymer as used in Example 13 and atactic-polystyrene as used in Comparative Example C1. The resins were blended and cast as in Example 1. The films were oriented and evaluated as in Example 13 and are summarized in Table 4.

TABLE 4

| Example | Composition | Orientation | Heat Treatment | TSD 3dB Temperature | Peak TSC Temperature |
|---|---|---|---|---|---|
| 14 | 95/5 sPS/PPO | MD 4:1 @ 135° C. TD 4:1 @ 137° C. | 255° C. | 91° C. | — |
| 15 | 90/10 sPS/PPO | MD 4:1 @ 140° C. TD 4:1 @ 155° C. | 255° C. | 98° C. | — |
| 16 | 60/40 sPS/aPS | MD only 4.5:1 @ 125° C. | — | — | 139° C. and 159° C. |
| 17 | 40/60 sPS/aPS | MD only 4.5:1 @ 125° C. | — | — | 142° C. |

The results shown in Table 4 suggest that the addition of PPO decreases the TSD 3 dB temperature even when the films are oriented to a high degree and heat treated. The addition of atactic-polystyrene appears not to influence the TSC peak current temperatures relative to Examples 12 and 13.

Example 18

A film was made from an immiscible blend of 90 wt % syndiotactic vinyl aromatic polymer from Example 1 and 10 wt % polycarbonate (PC) MPG700™ from Mobay Chemical Co. as in Example 14 and a uniaxial machine direction stretch of 4.5:1 at a temperature of about 140° C. Resulting peak current temperatures from TSC are shown in Table 5.

Examples 19–22

In Examples 19–22, films were made from sPS blends as in Example 18 except with a poly(ethylene terephthalate) (PET) with a 0.65 IV and a melt point of about 263° C., and isotactic polypropylene (iPP) as used in Comparative Example C2 instead of the PC used in Example 14. The blend ratios and subsequent orientation conditions are summarized in Table 5.

TABLE 5

| Example | Composition | Orientation | TSC Peak Current Temperatures |
|---|---|---|---|
| 18 | 90/10 sPS/PC | MD = 4.5:1 @ 140° C. | 147° and 165° C. |
| 19 | 90/10 sPS/PET | MD = 4.5 @ 125° C. | 136° and 156° C. |
| 20 | 80/20 sPS/PET | MD = 4.5 @ 125° C. | 158° C. |
| 21 | 70/30 sPS/iPP | MD = 4.5 @ 125° C. | 138° and 153° C. |
| 22 | 30/70 sPS/iPP | MD = 5.5 @ 125° C. | 104° C. |

The results in Table 5 for Examples 18–22 show that the addition of the immiscible polar polymers, such as PC or PET, increases the maximum TSC peak current relative to neat sPS, as in Example 13. The results for Example 22 show that if the concentration of sPS is lowered to the point where it is probably no longer a continuous phase, the TSC peak current temperature(s) for these particular blends are much lower.

Example 23

A blend of the polymer described in Example 13, PET described in Example 18, and a maleic anhydride-modified-aPS (MAaPS), commercially available from Arco Chemical Co. as Dylark™ 332 Engineering Resin was introduced into a 40 mm twin screw extruder in the ratio 87/10/3 (sPS/PET/MAaPS). A film was then made using the procedure described in Example 18 except the orientation temperature used was 125° C.

Examples 24–31

In Examples 24–31 films were made as in Example 23 except the materials used and the processing conditions were varied as summarized in Table 6. In Table 6, "Kraton" means a diblock copolymer of styrene and ethylene/propylene, commercially available from Shell Chemical Company, Houston, Tex. as Kraton™ G1701X Thermoplastic Elastomer, and "MAiPP" means a maleic anhydride-modified iPP, commercially available from British Petroleum, Rockport, N.J. as Polybond™. TSC peak current temperatures are also summarized in Table 6.

compatibilizer (at a constant ratio of sPS:PET) causes an increase in the TSC peak current temperatures.

Blends of sPS and iPP, such as those in Examples 26–31, suggest that the TSC peak current temperatures are affected by both the specific compatibilizer as well as potentially the continuous phase material. The results in Examples 27 and 30 show, unexpectedly, that the TSC peak current temperature is largely unchanged even when the continuous phase changes in sPS/iPP blends when MAaPS is used as a compatibilizer.

Example 32

In Example 32, a 13 layer multilayer film of an alternating structure: ABABABABABABA was made according to the procedure used in Example 6 of European Patent Application 591,055. The A layer was a syndiotactic-polystyrene homopolymer as used in Example 1. The B layer was iPP as used in Comparative Example C2 and represented 37% of the total film thickness. The orientation conditions and TSD 3 dB temperatures are shown in Table 7.

Example 33–43

In Examples 33–43, multi-layer films were made as in Example 32 except the B layer composition, the A:B ratio of relative layer thickness, and the processing conditions were varied as summarized in Table 7. When the B layer contains syndiotactic-polystyrene, it is a copolymer as used in Example 11. The resulting TSD 3dB temperatures are also summarized in Table 7.

TABLE 6

| Example | Composition | Orientation | TSC Peak Current Temperatures |
|---|---|---|---|
| 23 | 87/10/3 sPS/PET/MAaPS | MD = 4.5:1 @ 125° C. | 150° C. |
| 24 | 75/19/6 sPS/PETMAaPS | MD = 4.5 @ 125° C. | 156° C. |
| 25 | 64/27/9 sPS/PET/MAaPS | MD = 3.8 @ 125° C. | 145° and 162° C. |
| 26 | 64/27/9 sPS/iPP/Kraton | MD = 4.5 @ 125° C. | 143° C. |
| 27 | 64/27/9 sPS/iPP/MAaPS | MD = 4.5 @ 125° C. | 145° and 158° C. |
| 28 | 64/27/9 sPS/iPP/MAiPP | MD = 4.5 @ 125° C. | 148° C. |
| 29 | 27/64/9 sPS/iPP/Kraton | MD = 4.5 @ 125° C. | 93° C. |
| 30 | 27/64/9 sPS/iPP/MAaPS | MD = 4.5 @ 125° C. | 148° C. |
| 31 | 27/64/9 sPS/iPP/MAiPP | MD = 4.5 @ 125° C. | 95° and 115° C. |

Comparing the results in Table 6 to Table 5, one can see that the TSC peak current temperatures are affected by the addition of a compatibilizer. Furthermore, it appears for Examples 23–25 that increasing the concentration of the

TABLE 7

| Example | B Layer Composition | Ratio A:B | Orientation | Heat Treatment | TSD 3dB Temperature |
|---------|---------------------|-----------|-------------|----------------|---------------------|
| 32 | 100% iPP | 63:37 | MD 4:1 @ 130° C. | — | 106° C. |
| 33 | 15/85 sPS/iPP | 80:20 | MD 4:1 @ 130° C. | — | 105° C. |
| 34 | 15/85 sPS/iPP | 60:40 | MD 4:1 @ 130° C. | — | 103° C. |
| 35 | 15/85 sPS/iPP | 30:70 | MD 4:1 @ 130° C. | — | 101° C. |
| 36 | 100% iPP | 80:20 | MD 3.5:1 @ 115° C. TD 3.5:1 @ 107° C. | 250° C. | 127° C. |
| 37 | 30/70 sPS/iPP | 80:20 | MD 3.5:1 @ 115° C. TD 3.5:1 @ 107° C. | 250° C. | 124° C. |
| 38 | 30/70 sPS/iPP | 20:80 | MD 3.5:1 @ 115° C. TD 3.5:1 @ 107° C. | 250° C. | 123° C. |
| 39 | 50/50 sPS/iPP | 20:80 | MD 3.5:1 @ 115° C. TD 3.5:1 @ 107° C. | 250° C. | 122° C. |
| 40 | 70/30 sPS/iPP | 80:20 | MD 3.5:1 @ 115° C. TD 3.5:1 @ 107° C. | 250° C. | 120° C. |
| 41 | 70/30 sPS/iPP | 20:80 | MD 3.5:1 @ 115° C. TD 3.5:1 @ 107° C. | 250° C. | 123° C. |
| 42 | 64/27/9 sPS/iPP/Kraton | 80:20 | MD 3.5:1 @ 115° C. TD 3.5:1 @ 107° C. | 250° C. | 105° C. |
| 43 | 27/64/9 sPS/iPP/Kraton | 80:20 | MD 3.5:1 @ 115° C. TD 3.5:1 @ 107° C. | 250° C. | 115° C. |

Examples 32–35 and Examples 26–41 show that the TSD 3 dB temperatures are fairly insensitive to the alternate layer composition and layer thicknesses when the samples are oriented and heat treated under similar conditions. Examples 42 and 43 show a slight depression of the TSD 3 dB temperatures as was seen earlier in Example 26 when compared to Example 21.

Various modifications and alterations of this invention will become apparent to those skilled in the art without departing from the scope or spirit of this invention.

What is claimed is:

1. An electret, comprising:
   a charged dielectric composition;
   wherein said composition comprises a syndiotactic vinyl aromatic polymer.

2. The electret of claim 1 wherein the syndiotactic vinyl aromatic polymer comprises interpolymerized units derived from styrene.

3. The electret of claim 1 wherein said syndiotactic vinyl aromatic polymer consists essentially of interpolymerized units derived from vinyl aromatic monomers.

4. The electret of claim 1 wherein said syndiotactic vinyl aromatic polymer consists essentially of interpolymerized units derived from styrenic monomers.

5. The electret of claim 1 wherein said syndiotactic vinyl aromatic polymer has a racemic diad of at least 75% as determined by $^{13}$C NMR.

6. The electret of claim 1 wherein said syndiotactic vinyl aromatic polymer consists essentially of syndiotactic polystyrene.

7. The electret of claim 1 wherein said syndiotactic vinyl aromatic polymer comprises at least 5% by weight of the charged composition.

8. The electret of claim 1 wherein said charged composition comprises a blend of said syndiotactic vinyl aromatic polymer and at least one other polymer.

9. The electret of claim 8 wherein said blend is a miscible blend.

10. The electret of claim 8 wherein said blend is an imiscible blend.

11. The electret of claim 1 wherein said electret comprises at least two layers.

12. The electret of claim 11 wherein said syndiotactic vinyl aromatic polymer is substantially concentrated at the surfaces of layers.

13. The electret of claim 11 wherein at least 80% of said syndiotactic vinyl aromatic polymer is found in 20% or less of the volume of the multilayer composition.

14. The electret of claim 1 wherein said electret comprises an extruded film or fiber comprising said syndiotactic vinyl aromatic polymer.

15. The electret of claim 14 wherein said syndiotactic vinyl aromatic polymer is substantially concentrated on one major surface of said film or fiber.

16. The electret of claim 14 wherein said film or fiber has been stretched in at least one direction.

17. The electret of claim 14 wherein said film or fiber has been heat treated.

18. An article comprising the electret of claim 1 wherein said article is a transducer or an air filtration article.

19. An electret, comprising:
    an electrically charged dielectric film;
    wherein said film is oriented in at least one direction and comprises a syndiotactic vinyl aromatic polymer.

20. The electret of claim 19, wherein said film is metallized on at least one surface.

21. An electret, comprising:
    an electrically charged dielectric fiber;
    wherein said fiber is oriented in at least one direction and comprises a syndiotactic vinyl aromatic polymer.

* * * * *